(12) United States Patent
Rolland

(10) Patent No.: US 10,848,928 B2
(45) Date of Patent: Nov. 24, 2020

(54) METHOD FOR DYNAMIC FILTERING OF A GROUP COMMUNICATION

(71) Applicant: STREAMWIDE, Paris (FR)

(72) Inventor: Laetitia Rolland, Clamart (FR)

(73) Assignee: STREAMWIDE, Paris (FR)

( * ) Notice: Subject to any disclaimer, the term of this patent is extended or adjusted under 35 U.S.C. 154(b) by 8 days.

(21) Appl. No.: 16/108,507

(22) Filed: Aug. 22, 2018

(65) Prior Publication Data
US 2019/0069141 A1    Feb. 28, 2019

(30) Foreign Application Priority Data
Aug. 23, 2017  (FR) ...................................... 17 57822

(51) Int. Cl.
*H04L 12/26* (2006.01)
*H04W 4/08* (2009.01)
(Continued)

(52) U.S. Cl.
CPC ............. *H04W 4/08* (2013.01); *H04L 12/185* (2013.01); *H04L 45/745* (2013.01); *H04L 51/12* (2013.01); *H04L 51/14* (2013.01); *H04L 63/0263* (2013.01); *H04L 65/4061* (2013.01); *H04L 67/24* (2013.01); *H04W 4/06* (2013.01); *H04W 4/16* (2013.01); *H04L 12/1813* (2013.01); *H04L 12/1822* (2013.01); *H04L 51/04* (2013.01); *H04L 51/043* (2013.01); *H04L 51/10* (2013.01); *H04L 51/38* (2013.01); *H04W 4/12* (2013.01)

(58) Field of Classification Search
None
See application file for complete search history.

(56) References Cited

U.S. PATENT DOCUMENTS

| 2006/0109795 A1* | 5/2006 | Kamata ................. H04M 15/00 370/252 |
| 2007/0124381 A1 | 5/2007 | Zurko |

(Continued)

FOREIGN PATENT DOCUMENTS

| EP | 1 569 488 A1 | 8/2005 |
| EP | 2 849 383 A1 | 3/2015 |

OTHER PUBLICATIONS

Search Report issued in related application FR 17 57822, dated Mar. 22, 2018, 7 pages.

*Primary Examiner* — Zewdu A Beyen
(74) *Attorney, Agent, or Firm* — Faegre Drinker Biddle & Reath LLP

(57) ABSTRACT

A communications management method, implemented by a system comprising at least one user terminal and a communications management server, the server comprising a memory in which are stored: for each user, an identifier of the user associated with a current status of the user and at least one terminal identifier, and a definition of at least one group of users containing the list of identifiers of the user members of the group, the method comprising a step of establishing a communication between the user terminal and the group, during said step: the terminal sends a communication rule to the server, and the server establishes the communication between the user terminal and a set of terminals of user members of the group, said set being determined based on the communication rule and the current statuses of the user members of the group.

11 Claims, 5 Drawing Sheets

(51) Int. Cl.

| | |
|---|---|
| *H04L 29/08* | (2006.01) |
| *H04L 12/58* | (2006.01) |
| *H04L 29/06* | (2006.01) |
| *H04W 4/06* | (2009.01) |
| *H04W 4/16* | (2009.01) |
| *H04L 12/18* | (2006.01) |
| *H04L 12/741* | (2013.01) |
| *H04W 4/12* | (2009.01) |

(56) References Cited

U.S. PATENT DOCUMENTS

| | | | | |
|---|---|---|---|---|
| 2010/0223380 | A1* | 9/2010 | Zheng | H04L 65/403 |
| | | | | 709/224 |
| 2012/0151357 | A1* | 6/2012 | Roche | G06F 3/0481 |
| | | | | 715/736 |
| 2015/0365243 | A1* | 12/2015 | Westman | H04L 12/1818 |
| | | | | 370/261 |
| 2016/0364368 | A1* | 12/2016 | Chen | G06Q 10/107 |

\* cited by examiner

METHOD FOR DYNAMIC FILTERING OF A GROUP COMMUNICATION

CROSS-REFERENCE TO RELATED APPLICATIONS

This application claims the benefit of French Application No. 17 57822 filed Aug. 23, 2017, the entire content of which is incorporated herein by reference.

FIELD

The invention relates to a method for dynamic management of group communications. The communications considered may include the sending of multimedia messages, a conversation via instant messaging, or group calls.

BACKGROUND

Current telecommunications terminals such as mobile telephones (or smartphones, or handheld mobile devices), tablet computers, or laptop computers can run communication applications which allow audio and/or video communication or text messaging between two or more users of the application. This is the case, for example, of instant messaging applications that allow creating a conversation between multiple users by instant messaging.

To do so, the terminals transmit messages or multimedia files via a multimedia data network such as GPRS, EDGE, H, H+, 3G, 4G, WiFi, or Internet for example. "Multimedia message" is understood to mean a message containing one or more items of multimedia content such as an image, a video, audio content, or other content. Communication between the terminals is ensured by a messaging server via the multimedia data network.

Certain communication applications make it possible to define chat groups whose members (selected from the users of the application) are selected during creation of the group. These groups allow a user of the application to communicate easily and quickly with all the members of a group without having to select the members for each new communication, for example with each new message sent.

The composition of the group generally cannot be changed easily and quickly.

In particular, in some cases, the creation and distribution of groups are done by an administrator, which further restricts the possibility of changing the composition of the groups.

However, it may be that some members of the group are not always concerned by the communications sent within the application, but are receiving these communications anyway. These communications then constitute undesirable excess information for a user.

For example, consider the case of a group of professionals who may periodically be part of an on-call or standby team, the composition of the on-call or standby team varying in order to rotate the shift times.

In this case, having to define a new group corresponding to each new on-call or standby team is undesirable. It is also undesirable for all members of the group who may be on call or on standby to receive all communications relating to a specific shift and therefore only concerning those currently on duty.

There is therefore a need for a more flexible solution which allows varying the composition of a group of recipients of a communication.

SUMMARY

In view of the foregoing, the object of the invention is to provide a method for dynamic management of a group of users of a communication application.

In particular, an object of the invention is to provide the members of the group with the possibility of not receiving communications addressed to the group when they are not available or are not concerned by these communications.

Another object of the invention is to allow group members to simply join a group conversation when they are once again available.

In this regard, an object of the invention is a communications management method, implemented by a system comprising at least one user terminal and a communications management server, the server comprising a memory in which are stored:
for each user, an identifier of the user associated with a current status of the user and at least one terminal identifier, and
a definition of at least one group of users containing the list of identifiers of the user members of the group,
the method comprising a step of establishing a communication between the user terminal and the group, characterized in that, during said step:
the terminal sends the server a communication rule, and
the server establishes the communication between the user terminal and a set of terminals of user members of the group, said set being determined based on the communication rule and the current statuses of the user members of the group.

Advantageously, the current status of a user is selected among an available status and an unavailable status, and the step of establishing communication further comprises the selection, by the terminal, of the communication rule, among:
a "restricted" communication rule stating that the communication is only to be established with members of the group having the available status, and
an "extended" communication rule stating that the communication is to be established with all members of the group.

Preferably, the step of establishing the communication further comprises the sending, by the terminal to the server, of a request to establish communication with the group.

In certain variant embodiments, the method is implemented by a system further comprising an administrator terminal, and comprises a preliminary step of configuration of the group by an administrator terminal comprising the activation of a dynamic filtering attribute of the group, and a step of the server storing the activated character of the attribute linked to the group.

The management method may then comprise a step of creation or editing of the group, implemented by the administrator terminal, during which said configuration step is implemented.

Advantageously, the management method further comprises the displaying, on a human-machine interface of the messaging application, of at least one identifier of a user of the application, associated with an icon representing the current status of the user.

According to the method, the establishing of a communication comprises one among the group consisting of:
sending a multimedia message to the group,
creating a group chat via instant messaging,
initiating a group call, this call being of the simplex, duplex, or half-duplex type.

In the case where the establishing of the communication is the creation of a group chat via instant messaging, the method may comprise at least one additional step of a user terminal sending a message in the group chat, and the server sending the message to a set of members of the group determined based on the current statuses of the members.

The method may also comprise a step of changing the status of a user, comprising:
- the terminal of the user sending a status change request to the server,
- the server updating the current status of the user stored in memory, and
- the server sending an update notification to at least one terminal of a user.

The invention also relates to a computer program product, comprising instructions for implementing a method comprising:
- the receiving of a request to establish a communication with a group of users, the request comprising a communication rule, and
- the establishing of a communication with a set of terminals of members of the user group, said set being determined based on the communication rule and on the current status values of users associated with the terminals, when it is executed by a processor.

Another object of the invention is a communications management server, comprising:
- a memory, in which are stored:
  - a list of user identifiers, each identifier being associated with a current status of the user, and
  - a definition of at least one user group containing the list of identifiers of the users who are members of the group,
- a processor configured to execute the computer program product according to the above description.

Another object of the invention is a computer program product, comprising code instructions for implementing a method comprising steps of selecting a communication rule and sending the communication rule to a server along with a request to establish a communication, when executed by a processor.

Another object of the invention is a telecommunications terminal adapted for executing a communication program, said terminal comprising:
- an interface for connecting to a multimedia data network,
- display means of a human-machine interface,
- an interface for entering instructions, and
- a processor, configured for executing the above computer program product.

Finally, the invention relates to a computer system comprising at least one terminal and a server, respectively according to the above descriptions.

The method according to the invention enables dynamic filtering of members of a group with whom communication is established.

To achieve this, a user can select a communication rule with the group which allows the user to communicate with all members of the group or with only some of the members who have a particular status. Users can select a status that allows them not to receive group calls or messages when they are not available.

In this manner, the composition of the group can advantageously be varied according to circumstances and the availability of its members. In addition, communications received by an unavailable member can be substantially reduced.

BRIEF DESCRIPTION OF THE DRAWINGS

Other features, objects and advantages of the invention will be apparent from the description which follows, which is purely illustrative and non-limiting, and which is to be read with reference to the accompanying drawings in which.

DETAILED DESCRIPTION

Figure 1A:
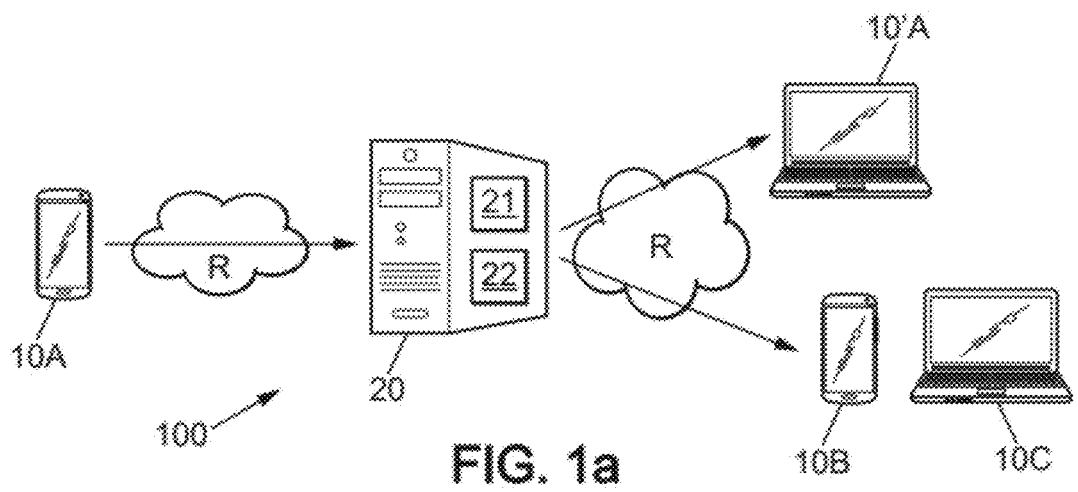
FIG. 1a shows the implementation of a status change for a user of a communication application

A communications management method will now be described with reference to the figures. This method is implemented by a computer system 1 shown in FIGS. 1a to 1c, comprising:
- at least one terminal 10 of a user, and
- a communications management server 20.

The terminal 10 and the server 20 are able to communicate with each other via a multimedia data network R.

The term "multimedia data network" is understood to mean any communication network that uses a set of communication protocols, with or without packet transfers, capable of transmitting multimedia data such as text, sound, speech, images, and/or video. Examples include GPRS, EDGE, UMTS, 3G, 4G, WiFi, WiMAX, Internet, etc.

The term telecommunications "terminal" is understood to mean an electronic device, possibly mobile, such as a mobile telephone, a smartphone, a tablet computer, or a computer, typically having a processor, a memory, and a communication interface with the network. The terminal is adapted to implement a computer program, and in particular a communication application, in the form of software comprising executable code instructions stored in memory.

In a preferred embodiment, the communications are implemented as part of an application, which in particular may be a mobile application or a web application which a user accesses via a web browser, on a fixed or mobile terminal.

The server 20 is able to receive, store, manage, and transmit multimedia messages between two terminals hosting the communication program/application. For this purpose it comprises a processor 21 as well as a memory 22, in which are stored:

all the identifiers of users of the application, each identifier being stored with one or more connection identifiers of a respective terminal of the user, and with a status of the user, the definition of one or more user groups, each group comprising a list of user identifiers.

In particular, and as shown in FIG. 1, a user A may have several terminals 10A, 10'A, each terminal hosting the program for implementing the group communications.

In the context of the invention, a user can establish a communication with one or more other user(s), or with a group of users, the communication comprising at least one of the following forms of communication:

sending and receiving a multimedia message, creating a chat via instant messaging and participating in the chat, initiating a group call, and participating in the call.

The group call may in particular be implemented by duplex, simplex, or half-duplex communication channels, this last mode of communication also being referred to as a "walkie-talkie" or "push-to-talk" type of call.

A user can also define a set of contacts among the other users and user groups, the contacts being stored in a memory of a terminal of the user or in a remote memory which the terminal can access (not shown).

Configuring a User Status

Figure 2A:
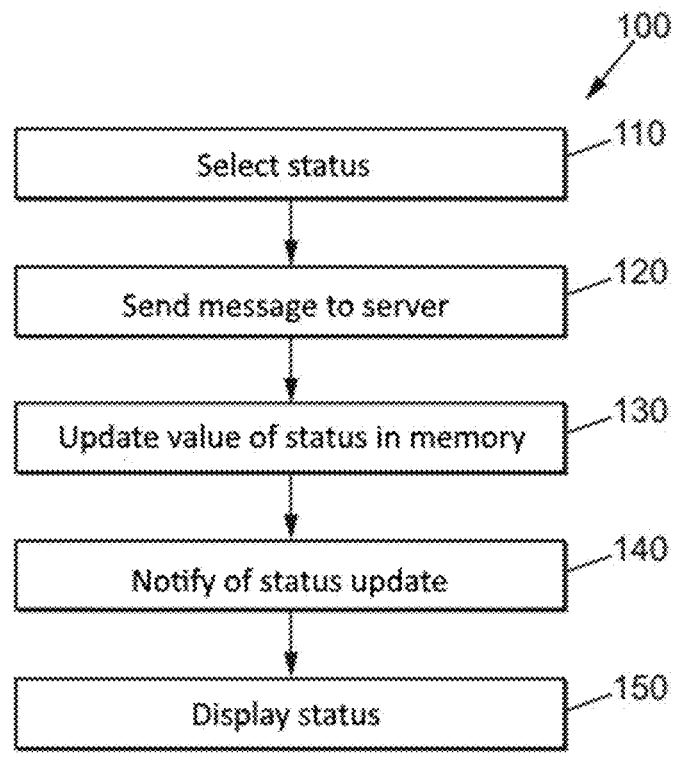

With reference to FIG. 1a and FIG. 2a, the implementation of a step of configuring a current status 100 of a user A is represented. Each user who is a member of a group can choose a current status among an "available" status, and an "unavailable" status which allows the user not to receive communications addressed to the group as long as he or she has this status.

Figure 3:
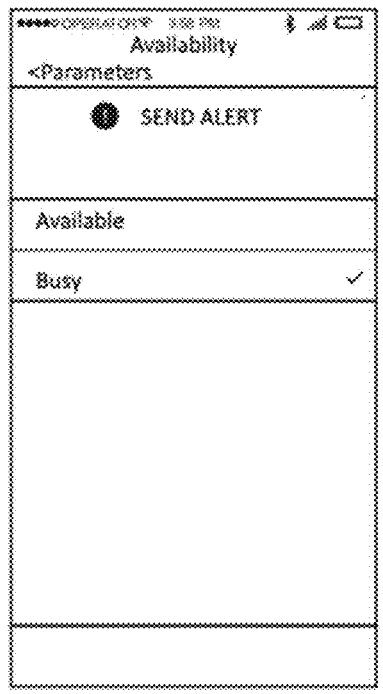
FIG. 3 represents an exemplary display of a human-machine interface of the application, showing the selection of a user status.
Figure 4:
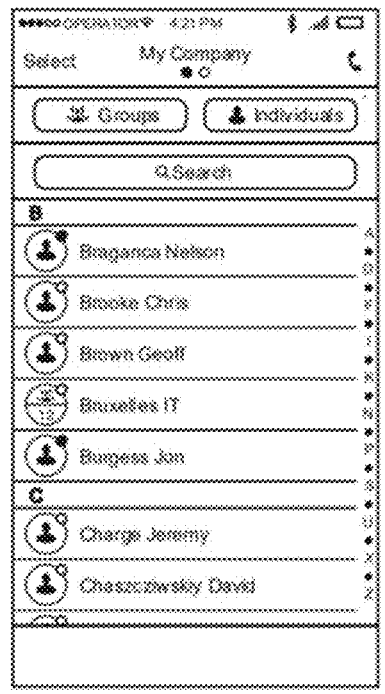
FIG. 4 represents an exemplary display of user statuses on a human-machine interface of the application.

With reference to FIG. 3, the change of current status by a user A is implemented by selecting a status 110 on the human-machine interface of the communication application. Once the status is selected, the user's terminal 10A sends a message to the server 20 indicating the selected status. The server updates 130 the value of the current status saved in memory and linked to the user's identifier. Then the server sends 140 to a set of users, which may be all of the user's contacts, a notification informing them of the current status of the user A. Next, the human-machine interface of a terminal of one of the users who received the notification advantageously displays 150 the current status of the user thus modified. For example, as shown in FIG. 4, the human-machine interface of an application can display a list of identifiers of contacts of a user and, associated with each contact, an icon representing the current status of the user.

Filtering a Group Communication

Figure 1B:
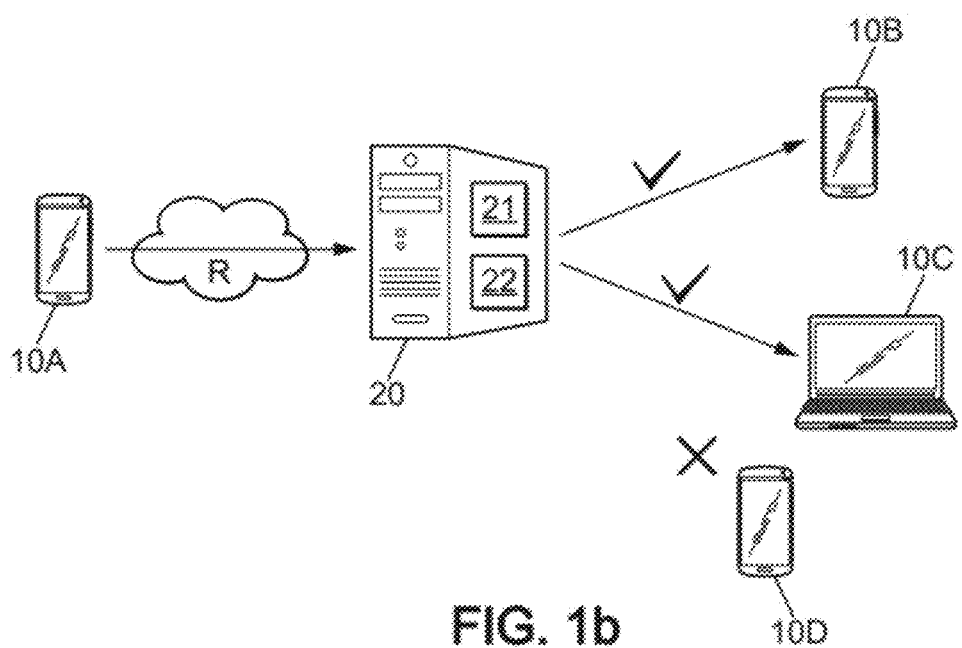
FIG. 1b shows establishing a communication with members of a group having the available status.
Figure 2B:
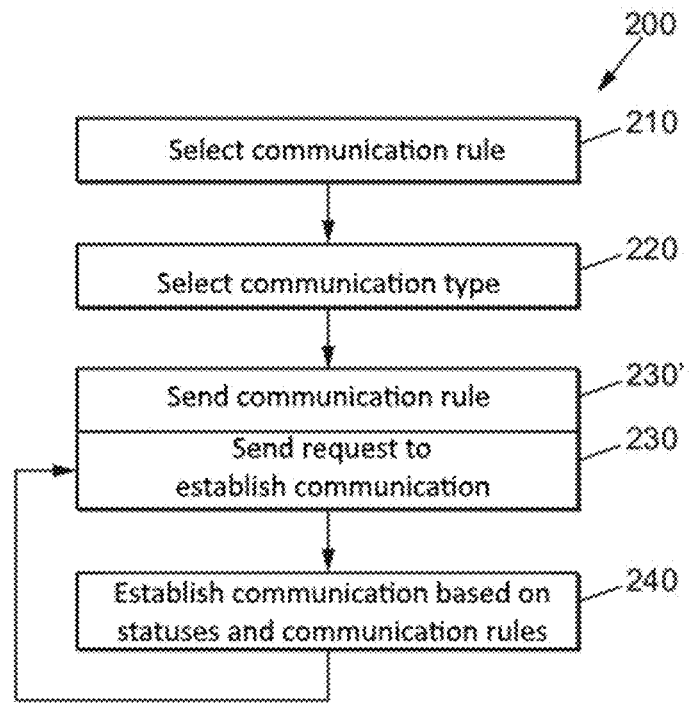
Figure 2C:
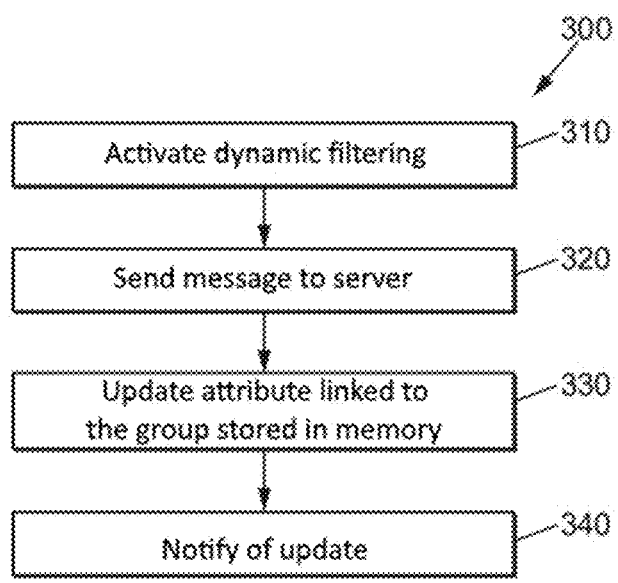

Referring to FIG. 1b and FIG. 2b, the implementation of a step 200 of establishing a communication between a terminal 10A of a user and a group is represented.

This step comprises the selection 210 of a communication rule by a user, on the man-machine interface of the application on his or her terminal. This communication rule is chosen among:

a "restricted" communication rule stating that the communication is only to be established with members of the group having an available status, and an "extended" communication rule stating that the communication is to be established with all members of the group.

Figure 5:
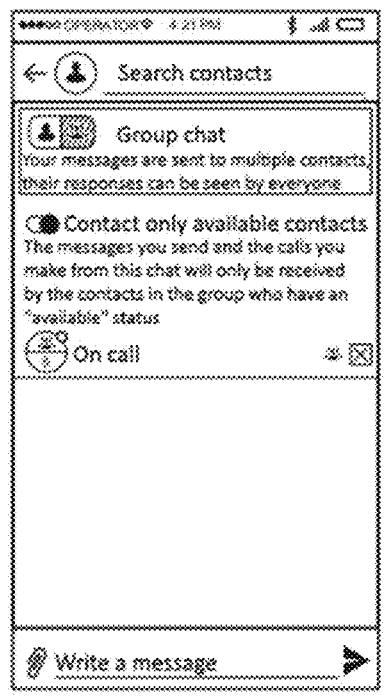
FIG. 5 represents an exemplary display showing the selection of a communication configuration on a human-machine interface of the application.

Selection of the rule can be presented as the activation or non-activation of a communication attribute under the restricted communication rule, as is the case in the human-machine interface example shown in FIG. 5.

Step 200 also advantageously includes the selection 220 by a user of a type of communication the user wishes to establish with the group, for example sending a one-time message, or opening a group chat via instant messaging, or initiating a group call.

Then the terminal of the user sends 230 to the server 20 a request to establish the selected communication, and sends 230' the communication rule chosen by the user. Advantageously, the request to establish communication and the communication rule are sent in a single message.

The server then establishes 240 the communication between the user terminal 10A and a set of members of the group, this set being determined based on the communication rule and the current statuses of the group members. The server therefore dynamically filters the group members with whom the communication is established, based on the current status of each member at the time the communication is established.

In particular, in the case where the chosen communication rule is the extended communication rule, the server 240 establishes communication with all members of the group regardless of their status.

On the other hand, in the case where the communication rule is the restricted communication rule, the server 240 establishes communication only with the members of the group having an available status. In FIG. 1b, terminals 10B and 10C of users B and C are schematically represented as available, and terminal 10D of user D as unavailable. In this example, terminal 10A sends a request to the server to establish a restricted communication with group {B, C, D}, and the server establishes the communication only with users B and C.

More precisely, in the case where the communication established by terminal 10A is the sending of a message, the members of the group having an available status receive the message sent by terminal 10A as well as a notification that a new message has been received. On the other hand, the group members having an unavailable status do not receive either the message or a notification that a message has been sent by terminal 10A.

In the case where the communication established by the terminal is the creation of a group chat, this initiation usually being accompanied by the sending of an instant message, only the available members of the group receive the message in the group chat created and a notification that a message has been received. Unavailable members do not receive any notifications or new messages, nor can they see the group chat in a list of chats on the human-machine interface of the application.

In the case where the communication established by the terminal is the initiation of a group call, the members of the group having an available status are notified of the call by the server and can accept the call, while members having an unavailable status are not notified of the call.

Advantageously, the initiation of a group call is accompanied by the automatic creation by the server of a group chat via instant messaging in which all members of the group who are available when the call is initiated are included.

When the established communication is the creation of a group chat in instant messaging (conversation created at the initiative of a user terminal, or of the server in the case of a chat simultaneous with a group call), the steps of a user terminal sending 230 a message in the chat and the server determining 240 the group members available for sending the message are implemented for any new message sent in the chat.

In this manner, an unavailable member of the group does not receive any message from the chat or any new message notification. The group chat is also not displayed in a list of chats on the human-machine interface of that members terminal. On the other hand, if the user then changes the status to available, he or she receives and is notified of new messages sent in the chat beginning from the change of status. The chat appears on the human-machine interface of the terminal of that member starting with the first message received.

A member of the group who changes their status from available to unavailable, and where appropriate the user who started the chat, no longer receives any message or new message notification from the moment of the change of status.

Advantageously, members in the chat are not notified of status changes of other members of the group.

Configuring a Group

According to one particular embodiment of the invention, it may be provided that only certain groups of users are configured to permit the filtering functionality described above.

Figure 1C:
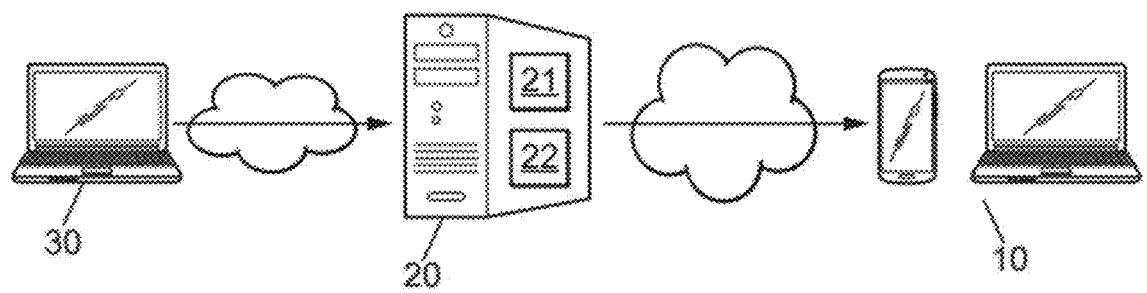
FIG. 1c shows the configuration of a user group by an administrator, FIG. 2a schematically represents the main steps in implementing a status change for a user, FIG. 2b schematically represents the main steps in establishing a communication with the members of a group, FIG. 2c schematically represents the main steps in configuring a group of users.

With reference to FIG. 1c, this configuration can advantageously be achieved by an administrator terminal 30. The administrator terminal 30 comprises a processor adapted for executing the communication program or application, and a memory for storing the lines of code of the program. It also comprises a communication interface with the multimedia network R, allowing it to communicate with the server 20 via the network.

The configuration step 300 then comprises the activation 310 by an administrator, in the human-machine interface of the application on the terminal, of a dynamic filtering attribute associated with the group. The terminal 30 then sends 320 a message to the server to inform the server of the activated character of the attribute. The server updates the memory 330 to save the activated character of the attribute linked to the group. The server then sends 340 to a set of user terminals of the application, for example all terminals of user members of the group, an update message allowing the recipients to select the communication rule according to step 210 for all new communications established with this group.

Figure 6:
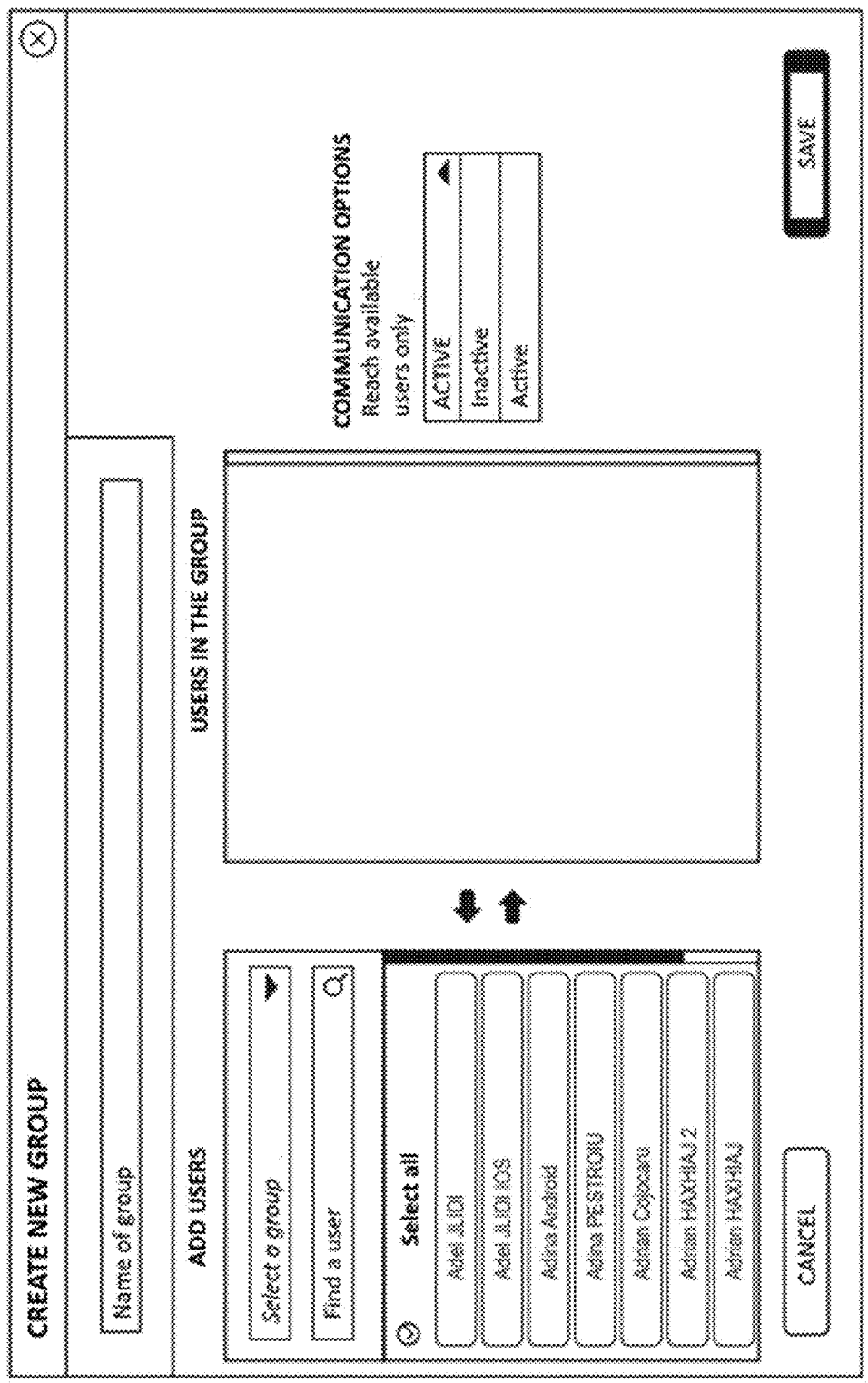
FIG. 6 represents an exemplary display showing the configuration of a group of users on a human-machine interface of the application.

Advantageously, but optionally, this configuration step is implemented during creation or editing of the group by the administrator, as is the case in the example shown in FIG. 6, where a page of a human-machine interface of an administrator terminal is represented, and where the administrator has the possibility of activating the communication option "Reach available users only".

The management method described above thus allows each user to define an available or non-available status which is visible to other users, and provides the ability to filter the establishing of communications based on the status of the users. The amount of unwanted messages received by a user can therefore be reduced, allowing better visibility of relevant messages.

The invention claimed is:

1. A communications management method, implemented by a system comprising at least one user terminal and a communications management server,
    the communications management server comprising a memory in which are stored:
        for each user, an identifier of the user associated with a current status of the user and at least one terminal identifier, the current status of the user being selected among a status "available" and a status "unavailable," and
        a definition of at least one group of users containing the list of identifiers of the members of the group of users,
    the method comprising a step of establishing a communication between the user terminal and the group of users,
    wherein, during said step:
        the terminal selects a communication rule among:
            a "restricted" communication rule stating that the communication is only to be established with members of the group of users having as their current status the status "available," and
            an "extended" communication rule stating that the communication is to be established with all members of the group of users regardless of whether their current status is the status "available" or the status "unavailable,"
        the terminal sends the communications management server the selected communication rule, and
        the communications management server establishes the communication between the user terminal and a set of terminals of user members of the group of users, said set being determined based on the received communication rule and the current statuses of the members of the group of users,
    wherein the communications management server establishes the communication only with members of the group of users having as current status the status "available" if the received communication rule is the "restricted" communication rule, and wherein the communications management server establishes the communication with all members of the group of users regardless whether their current status is the status "available" or the status "unavailable" if the received communication rule is the "extended" communication rule.

2. The management method according to claim 1, wherein establishing a communication between the user terminal and the group of users further comprises sending, by the terminal to the communications management server, a request to establish communication with the group.

3. The management method according to claim 1, implemented by a system further comprising an administrator terminal,
    the method comprising a preliminary step of configuration of the group of users by the administrator terminal comprising the activation of a dynamic filtering attribute of the group of users, and a step of the communications management server storing the activated character of the attribute linked to the group.

4. The management method according to claim 3, further comprising a step of creation or editing of the group of users, implemented by the administrator terminal, during which said configuration step is implemented.

5. The management method according to claim 1, further comprising the displaying, on a human-machine interface of the messaging application, of at least one identifier of a user of the application, associated with an icon representing the current status of the user.

6. The management method according to claim 1, wherein the establishing of a communication between the user terminal and the group of users comprises one among the group of users consisting of:
    sending a multimedia message to the group of users,
    creating a group chat via instant messaging,
    initiating a group call.

7. The management method according to claim 1, wherein the establishing of a communication between the user terminal and the group of users is the creation of a group chat via instant messaging, and the method comprises at least one additional step of a user terminal sending a message in the group chat, and the communications management server sending the message to a set of members of the group of users determined based on the current statuses of the members.

8. The management method according to claim 1, further comprising a step of changing the current status of a user, comprising:

the terminal of the user sending a status change request to the communications management server, the communications management server updating the current status of the user stored in memory, and the communications management server sending an update notification to at least one terminal of a user.

9. A non-transitory computer program product, comprising code instructions for implementing a method comprising:

the receiving of a request to establish a communication with a group of users, each user of the group of users having a current status selected among a status "available" and a status "unavailable," the request comprising a communication rule selected among:

a "restricted" communication rule stating that the communication is only to be established with members of the group of users having as their current status the status of "available", and an "extended" communication rule stating that the communication is to be established with all members of the group of users regardless of whether their current status is the status "available" or the status "unavailable," and the establishing of a communication with a set of terminals of members of the group of users, said set being determined based on the received communication rule and on the current statuses of the members of the group of users associated with the terminals, wherein the communication is established only with members of the group of users having as current status the status "available" if the received communication rule is the "restricted" communication rule, and wherein the communication is established with all members of the group of users regardless whether their current status is the status "available" or the status "unavailable" if the received communication rule is the "extended" communication rule, when said code instructions are executed by a processor.

10. A communications management server, comprising:

a memory, in which are stored:

a list of user identifiers, each identifier being associated with a current status of a user, the current status of the user being selected among a status "available" and a status "unavailable," and a definition of at least one group of users containing the list of identifiers of the members of the group of users, a processor configured to execute the non-transitory computer program product according to claim 9.

11. A computer system comprising at least one terminal and a communications management server, wherein the terminal comprises:

an interface for connecting to a multimedia data network, display means of a human-machine interface, an interface for entering instructions, and a processor, configured to:

select a communication rule for establishing a communication with a group of users, each user of the group of users having a current status selected among a status "available" and a status "unavailable", among:

a "restricted" communication rule stating that the communication is only to be established with members of the group of users having as current status the status "available", and an "extended" communication rule stating that the communication is to be established with all members of the group of users regardless whether their current status is the status "available" or the status "unavailable", and send the selected communication rule to the communications management server along with a request to establish a communication, wherein the communications management server comprises:

a memory, in which are stored:

a list of user identifiers, each identifier being associated with a current status of a user, the current status of the user being selected among a status "available" and a status "unavailable," and a definition of at least one group of users containing the list of identifiers of the members of the group of users, a processor configured to:

receive the request to establish a communication with the group of users, the request comprising a communication rule selected among:

the "restricted" communication rule and the "extended" communication rule stating that the communication is to be established with all members of the group of users regardless of whether their current status is the status "available" or the status "unavailable," and the establishing of establish a communication with a set of terminals of members of the group of users, said set being determined based on the received communication rule and on the current statuses of users associated with the terminals, wherein the communication is established only with members of the group of users having as current status the status "available" if the received communication rule is the "restricted" communication rule, and wherein the communication is established with all members of the group of users regardless whether their current status is the status "available" or the status "unavailable" if the received communication rule is the "extended" communication rule.

* * * * *